Dec. 10, 1968   T. W. WILLIAMS III   3,415,478
AIR TABLE
Filed Jan. 27, 1967

INVENTOR
THOMAS WALLEY WILLIAMS III
BY
*Robert J. Schiller*
ATTORNEY

United States Patent Office 3,415,478
Patented Dec. 10, 1968

3,415,478
AIR TABLE
Thomas Walley Williams III, Belmont, Mass., assignor to The Ealing Corporation, Cambridge, Mass., a corporation of Delaware
Filed Jan. 27, 1967, Ser. No. 612,227
8 Claims. (Cl. 248—346)

ABSTRACT OF THE DISCLOSURE

A laminated air table, the top surface of which has a number of small holes distributed therein, each hole communicating with a larger air plenum chamber located below the top surface. The plenum chambers are formed from two strata each having an ordered array of perforations, one strata being staggered relative to the other so that each perforation of one stratum communicates with several perforations of the other stratum. Below the chambers is a honeycomb support layer, the cells of the honeycomb being closed. A large air chamber is included for coupling a supply of air to a plurality of air plenum chambers simultaneously. The method of making the table involves forming it upside down on a preformed surface of a block, forcing at least the top surface of the table to conform to the preformed surface, and permitting bonding agent between layers to set while the table is under pressure.

---

This invention relates to air tables, and more particularly to novel means for providing an air-bearing surface.

Considerable interest has been displayed in the use of air-suspended devices for the study of physical laws such as the conservation of momentum, impact elasticity and the like. Two-dimensional air tables have therefore been created to provide an air cushion or bearing which supports the items or pucks which are thus movable in the two dimensional plane of the table with considerably reduced friction. Generally the air cushion is provided by a perforated surface placed over an air-distribution manifold. These tables, while simple in theory, tend to be difficult and expensive to make, primarily because of problems in maintaining the planarity of the table surface and in obtaining uniform air distribution across the entire table surface. A number of devices making use of air-bearing surfaces have been described in the American Journal of Physics, 28,147 (1960); 30,503 (1962); 31,255 (1963); and particularly 31,867 (1963).

The present invention has as its principal object, the provision of novel air-table structure which is relatively inexpensive and simple to manufacture whilst possessing excellent surface and air distribution characteristics, and the method of making same.

To effect the foregoing and other objects, the present invention generally is in the form of a laminated structure having an air distributing top surface element including a plurality of small perforations therethrough, a bottom supporting surface element, and, sandwiched between the two surface elements, a first layer adjacent the bottom element and comprising a plurality of elongated tubular sieve elements having their long axes parallel to one another and disposed normally to the surface elements, and a second layer adjacent the top surface and constituting an air distribution manifold. The second layer comprises a first perforated stratum wherein the perforations are preferably much larger than those in the top surface element, and are uniform in size, regularly distributed and preferably shaped to provide in cross-section a central opening with at least two equiangularly disposed side lobes. The second layer also comprises a second stratum, preferably identical to the first. The perforations are dimensioned and the strata are disposed immediately adjacent one another in staggered relation so that a perforation in one stratum will be in communication with, in this instance, two perforations in the other stratum. The two strata are located so that immediately below each perforation in the top surface element, there is at least one perforation in the underlying stratum. Means are provided for creating an air flow through the bottom of the two strata.

Other objects of the invention will in part be obvious and will in part appear hereinafter. The invention accordingly comprises the apparatus possessing the construction, combination of elements, and arrangement of parts and the several steps and the relation of one or more of such steps with respect to each of the others, all of which are exemplified in the following detailed disclosure, and the scope of the application of which will be indicated in the claims.

For a fuller understanding of the nature and objects of the present invention, reference should be had to the following detailed description taken in connection with the accompanying drawings wherein.

It will be appreciated that the term "air table" as used herein is intended to include devices other than those merely providing an air bearing or cushion over a surface. Clearly, the latter posits the provision of a positive pressure air supply and, in use, the flow of air outwardly from perforations in the top surface. However, the same device can, with the application of a negative pressure in its air-distribution system provide a reversal of the air flow into the perforations and thus serve as a vacuum frame.

Figure 1:
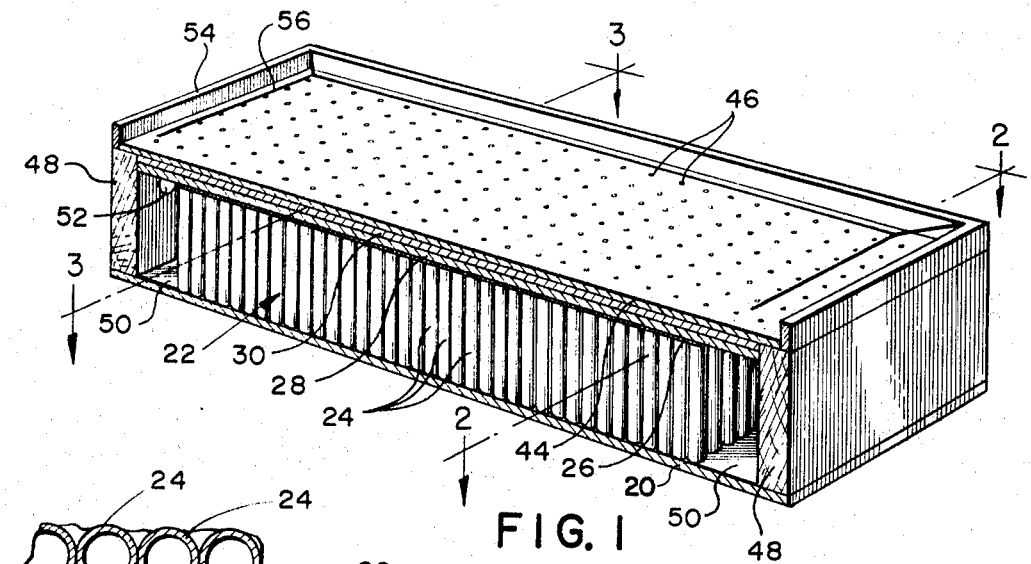
FIG. 1 is a perspective view, partly broken away showing an assemblage incorporating the principles of the present invention.

Referring now to the drawing, there will be seen in FIG. 1 an exemplary embodiment of an air table incorporating the principles of the present invention and comprising bottom support layer 20, preferably a sheet of imperforate, substantially rigid, light-weight material such as the high-density, compressed wood fiber-lignin board sold under the trade name "Benelex 70 Lofting Board," by the Masonite Corporation, Chicago, Illinois, for example 1/8" thickness. The sheet may be rectangular, circular or the like depending on the desires of the builder of the device. As additional means for endowing the table with structural rigidity while minimizing weight, bonded to the upper surface of layer 20 is relatively thick sieve layer 22 comprising a plurality of hollow, elongated, tubular elements 24 having their long axes parallel to one another and substantially normal to the upper surface of layer 20, the long dimensions of element 24 being substantially equal to one another and much greater than the cross-section dimension.

Figure 2:
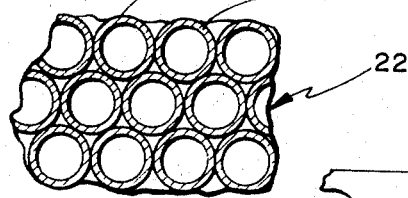
FIG. 2 is a partial cross-section taken along the lines 2—2 in FIG. 1 through a supporting layer thereof.

Tubular elements 24 are disposed so that their walls are in contact with other tubular elements and connected or bonded thereto. Typically, element 24 can be circular, hexagonal or the like in cross-section, such that layer 22 appears as a honeycomb type of structure as shown in FIG. 2. The cells formed by elements 24 are preferably closed as, for example, by having one surface of a very thin sheet 26 of air-impervious material such as a paper-based phenolic plastic affixed across the upper surface of layer 22, the lower surface of the latter being, of course, closed by layer 20. Bonding of layer 22 to both layer 20 and sheet 26 can be readily accomplished by any of a large number of adhesives, such as epoxy resins or the like.

Figure 3:
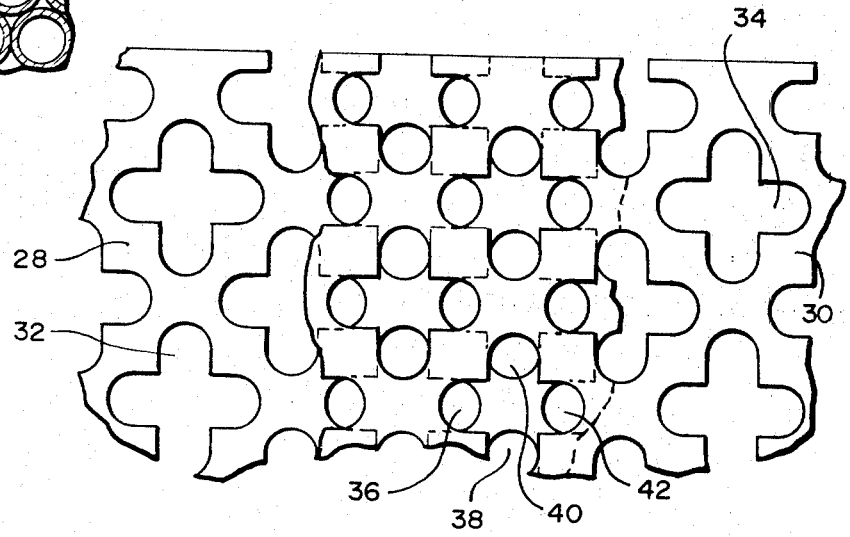
FIG. 3 is a schematic partial cross-section taken along the lines 3—3 of FIG. 1 through the air distribution layers thereof.

Mounted on the other surface of sheet 26 is an air distribution manifold comprising a sandwich of at least two relatively thick strata 28 and 30, each advantageously formed of 1/8" thick compressed wood fiber-lignin board (Masonite) which is quite light weight and structurally strong. In the form shown, particularly in FIG. 3, stratum 28 contains a plurality of separate, spaced perforations 32 which preferably are multilobed, e.g. cruciform or quadrifoil in order to increase lateral dimensions without decreasing the strength of the stratum. All of perforations 32 are symmetrical in shape, identical in size and configuration, and are distributed across stratum 28 is a uniform, regular pattern, e.g. with their centers lying at the points of intersection of a regular grid such as a rectangular grid or, as shown, a triangular grid to achieve a higher density of distribution of perforations. Fiber board perforated in this manner is commercially available as decorative panels sold by the Masonite Corporation as their "Cloverleaf Filigree." Stratum 28 is preferably bonded on its lower surface to sheet 26 so that the latter forms a wall for most of perforations 32.

Stratum 30 also contains a plurality of perforations 34 and preferably is identical to stratum 28, particularly in terms of the size, shape and distribution of perforations 34. Stratum 30 is bonded on its lower surface to the upper surface of stratum 28 in a position wherein each of perforations 34 is registered in a predetermined manner with *n* corresponding perforations 32 in stratum 28 (neglecting perforations abutting the edges of the layers), *n* being the number of lobes of the type of perforation used. In the particular embodiment shown, substantially each perforation of stratum 28 then communicates with perforations of stratum 30 along four portions or channels (typically 36, 38, 40, and 42 in FIG. 3) created by the overlap of the lobes of perforations 32 and 34. Similarly, each perforation of stratum 30 then communicates along four channels with substantially each perforation in stratum 28.

Bonded to the top surface of stratum 30 is air distribution means comprising layer 44, also typically of 1/8" fiber board. Layer 44 contains a pattern of perforations 46 therethrough, for example, formed by a #74 drill bit (0.0225" diameter). Each perforation 46 is positioned substantially above at least one corresponding perforation 34, and communicates, for example, with the center of each channel (such as 36) defined by the cooperation of the lobes of perforations 34 with perforations 32.

Perforations 46 are substantially uniform in size and much smaller than the perforation in strata 30 and 28. This then provides a high pneumatic resistance to leakage of air from the manifold system so that substantially the largest possible proportion of the air pressure drop through the air table occurs across layer 44. The desired pressure drop is largely determined by the nature of the puck used with the table because the pressure must be greater than the weight-area ratio of the puck.

While in the embodiment shown, the necessary air resistance is provided by the plurality of tiny perforations 46 it will be apparent that much larger holes blocked with a fine mesh or cloth will also provide the leaky resistance necessary. Alternatively, layer 44 can have a series of fine cuts or channels for example in a grid pattern, to achieve a similar end. The terms "holes" or "perforations" used in connection with layer 44 is thus intended to include such and other alternatives.

It will be appreciated that when layers are formed of light-weight materials such as fiber board or the like and the latter are sheets which are comparatively thin with respect to their length and breadth, a substantial amount of flexibility will be present. Not only can a relatively inexpensive structure rigid enough to maintain excellent planarity be formed from such flexible materials, but the flexibility itself is advantageous in the construction of the structure as will be seen from the following discussion.

The preferred method of construction involves the use of a very rigid foundation block, typically a thick slab of granite, glass or the like, the upper surface of which is plane to the desired tolerance.

Alternatively, if it is desired to provide other surface configurations to the air table top, the foundation block can be appropriately shaped, as in hyperboloidal, ellipsoidal or paraboloidal curves.

Layer 44 which will form the top of the air table is laid top surface down onto the foundation block. Successively, stratum 30 and stratum 28 are then laid on in staggered relation. Lastly, in order, sheet 26, layer 22 and layer 20 are placed. Of course, each successive element of the table is cemented to the element underneath. Care should be taken that the cement does not set-up or cure until well after the successive layers are all assembled, thereby insuring that portions of the layers may move laterally with respect to one another in the event various layers flex.

Finally, the entire sandwich thus formed is placed under pressure substantially uniformly applied to bottom layer 20 such as from an inflated air bag or similar means. The cement between layers is allowed to set whilst the sandwich is thus enclosed. The flexibility of most of the layers allows them to conform closely to the surface configuration of the foundation block. The cement, when set, maintains these structural characteristics and the resulting structure is surprisingly rigid. Almost any minor thickness irregularity in any layer becomes a non-uniformity in the surface of bottom layer 20. Since the surface accuracy of layer 20 is not particularly important, such non-uniformity is usually acceptable. Obviously, this technique allows a plane (or other desired shape) surfaced table to be made of materials whose thickness tolerances are of only normal commercial grade.

In forming the table, typically the various layers are all rectangular, and in a preferred embodiment, top and bottom layers 44 and 20 respectively have the same dimensions, strata 28 and 30 are slightly shorter in width and breadth, and layers 22 and 26 are substantially lesser in width and breadth than strata 28 and 30. When these elements are laid to form the table, they are centered with respect to one another and preferably a rectangular frame or edge member 48 is placed between the edges of layers 44 and 20. Member 48 can be of wood, plastic or the like and is preferably dimensioned in thickness to be about equal to the combined thickness of layers 22 and 28, and strata 28 and 30. Member 48 extends inwardly from the edges of layer 44 and 20 a distance lesser than the difference in dimension between layer 20 and layer 22, hence defines a wall of a channel or hollow chamber 50 surrounding layer 22. An entrance port 52 is provided, for example through edge member 48 for connecting chamber 50 to a source of either a vacuum or air at superatmospheric pressure. Chamber 50 serves as pneumatic coupling which insures that air flow can simultaneously occur between the chamber and fairly large plurality of perforations in stratum 28 forming to top wall of the chamber.

In operation, air, for example introduced under pressure into port 52 pressurizes chamber 50 whence it flows simultaneously into the plurality of perforations abutting chamber 50. It will be apparent that in the structure described, substantially each perforation 32 and 34 forms an air plenum chamber, and also constitutes a system for distributing the air four ways into other similar chambers. Thus, air is rapidly distributed through the system, the air pressure from chamber to chamber quickly reaching equality because of the efficient distribution and because perforations 46 are very small relative to the dimensions of the channels formed by the overlying lobes of perforations 32 and 34, or relative to the size of the perforations themselves. Hence, air is driven outwardly from substantially all of perforations 46 at about the same velocity. This provides an air cushion above the top surface of layer 44 which cushion will easily support a puck or disk, typically of glass, with greatly minimized friction relative to layer 44. The pucks, as well known in the art, are of considerably greater cross-section dimension that the distance between perforations 32, so that the air issuing from a large number of holes uniformly supports a puck.

A low wall can be readily formed about the top surface of layer 44 as by a frame 54 extending upwardly from the top surface However, for experimental usage of the air-table, such walls should absorb minimum energy from moving pucks and hence taut wire 56 can be strung inside and spaced from the table walls to provide a highly resilient barrier.

Since certain changes may be made in the above apparatus and process without departing from the scope of the invention herein involved it is intended that all matter contained in the above description or shown in the accompanying drawing shall be interpreted in an illustrative and not in a limiting sense.

What is claimed is:

1. An air-table of laminar structure comprising in combination:
   a support layer comprising a plurality of hollow elongated tubular cells having their axes of elongation directed substantially parallel to one another and perpendicularly to the common plane of said table;
   a manifold layer comprising a first stratum having a plurality of perforations in ordered array, and a second stratum having a plurality of like perforations in like array, said strata being disposed with respect to one another so that portions of each perforation in a stratum form communicating channels with corresponding portions perforations in the other stratum;
   an air-distributing layer having a plurality of holes therein said layer being positioned such that at least one of said holes enters a corresponding one of said perforations in the stratum next adjacent said air-distributing layer; and
   an air chamber, a wall of which is at least in part defined by a portion of one of said strata, so as simultaneously to communicate pneumatically with a plurality of the perforations in said strata.

2. An air-table as defined in claim 1 wherein said air chamber substantially surrounds the edge of said support layer and includes means defining a port for connecting said chamber to a supply of air.

3. An air-table as defined in claim 1 wherein said perforations are shaped to have $n$ lobed portions ($n$ being at least 2), said strata being disposed with respect to one another so that said lobed portions of each perforation in one stratum form communicating channels with corresponding lobed portions of substantially $n$ perforations in the other stratum.

4. An air-table as defined in claim 1 including a pair of substantially gas impervious sheets disposed across opposite ends of said cells so as to close the latter.

5. An air-table as defined in claim 1 wherein said manifold layer is wood fiber board and said perforations are substantially cruciform.

6. An air-table as defined in claim 1 wherein said holes in said air-distributing layer are smaller in maximum cross-section dimension than the cross-section dimension of the corresponding channel.

7. Method of making an air-table component comprising the steps of:
   on a preformed surface of a substantially rigid foundation, laying down a first layer of material having a plurality of openings therein in ordered array;
   laying on said first layer a first stratum of material having a plurality of perforations therein in ordered array;
   each perforation being larger than said openings and being registered so that at least one of said openings communicates with one of said perforations;
   laying down on said first stratum a second stratum of material having a plurality of like perforations therein in like ordered array;
   disposing said second stratum so that substantially each perforation therein communicates with at least two perforations in said first stratum;
   laying down on said second stratum a sheet of substantially impervious material;
   laying down on said sheet a support layer comprising a plurality of elongated tubular cells having their axes of elongation directed substantially parallel to one another and perpendicularly to the surface of said sheet;
   laying down on said support layer a last layer of substantially inperforated material;
   applying bonding agent between each of the adjoining layers, strata and sheets;
   applying a substantially uniform pressure to said last layer, said pressure being directed toward said preformed surface;
   delaying the setting of said agent to a permanent bond at least until after said pressure has been applied; and
   maintaining said pressure until said bonding agent has set.

8. Method as defined in claim 7 wherein at least said first layer and said strata are flexible enough to flex relative to said preformed surface and wherein said pressure is of a magnitude sufficient to force at least said first layer to conform to the contour of said preformed surface.

References Cited

UNITED STATES PATENTS

| | | | |
|---|---|---|---|
| 2,815,249 | 12/1957 | Curtenius. | |
| 2,879,875 | 3/1959 | Swackhamer. | |
| 3,107,078 | 10/1963 | Schutt | 248—363 |
| 3,126,192 | 3/1964 | Stein | 248—362 |

JOHN PETO, *Primary Examiner.*

U.S. Cl. X.R.

248—363; 161—407; 214—1